(12) United States Patent
Peterson et al.

(45) Date of Patent: Mar. 4, 2025
(10) Patent No.: US 12,240,269 B1

(54) LOAD WHEEL WITH HEAT DISSIPATING HUB

(71) Applicant: Superior Tire & Rubber Corporation, Warren, PA (US)

(72) Inventors: Joseph J. Peterson, Warren, PA (US); Kyle Robert Knotowicz, Jamestown, NY (US)

(73) Assignee: SUPERIOR TIRE & RUBBER CORP., Warren, PA (US)

( * ) Notice: Subject to any disclaimer, the term of this patent is extended or adjusted under 35 U.S.C. 154(b) by 609 days.

(21) Appl. No.: 17/361,954

(22) Filed: Jun. 29, 2021

Related U.S. Application Data

(60) Provisional application No. 63/047,472, filed on Jul. 2, 2020.

(51) Int. Cl.
*B60B 33/00* (2006.01)
*B60B 27/00* (2006.01)
(Continued)

(52) U.S. Cl.
CPC ...... *B60B 33/0028* (2013.01); *B60B 27/0005* (2013.01); *B60B 27/02* (2013.01);
(Continued)

(58) Field of Classification Search
CPC .............. B60B 27/0005; B60B 27/001; B60B 27/0094; B60B 3/10; B60B 2900/513;
(Continued)

(56) References Cited

U.S. PATENT DOCUMENTS 4,071,279 A * 1/1978 Chung ................... B29D 30/02
528/80
5,567,019 A * 10/1996 Raza .................... A63C 17/223
301/5.307
(Continued)

FOREIGN PATENT DOCUMENTS

CN 108454314 A 8/2018
DE 3704512 C2 * 3/1990
(Continued)

OTHER PUBLICATIONS

Dong Hyun Lim, Sung Chul Kim, Thermal performance of oil spray cooling system for in-wheel motor in electric vehicles, Applied Thermal Engineering, (2013), pp. 1-11.

*Primary Examiner* — Kip T Kotter
(74) *Attorney, Agent, or Firm* — Paul D. Strain, Esq.; Strain & Strain PLLC

(57) ABSTRACT

A load wheel for a vehicle is provided having a cylindrical hub with an axis, a first sidewall, a second sidewall, an outer surface, a central core extending coaxially within the hub, and a plurality of passageways extending in an axial direction between the first and second sidewall. A solid, non-pneumatic tire is bonded to the outer surface of the hub, and a set of bearing is mounted in the central core of the hub. The hub is characterized by a "heat factor" equal to the (hub mass×hub specific heat)/surface area exposed. The heat factor for a hub comprising passageways is compared to the heat factor for a solid hub to derive a heat factor ratio, which is used to select the exposed surface area of the hub and maintain the operating temperature of the wheel below the failure temperature.

13 Claims, 7 Drawing Sheets

(51) Int. Cl.
*B60B 27/02* (2006.01)
*B60C 7/00* (2006.01)
*B60C 7/24* (2006.01)
*B60C 7/12* (2006.01)

(52) U.S. Cl.
CPC ............ *B60B 33/0039* (2013.01); *B60C 7/24* (2013.01); *B60C 2007/005* (2013.01); *B60C 7/12* (2013.01)

(58) Field of Classification Search
CPC ............ B60B 33/0028; B60B 33/0039; B60B 27/00; B60B 27/02; B60B 3/007; B60B 2200/40; B60B 2200/41; B60B 2200/43; B60C 7/12; B60C 7/24; B60C 2007/0005; A63C 17/223
See application file for complete search history.

(56) References Cited

U.S. PATENT DOCUMENTS

| | | | |
|---|---|---|---|
| 5,692,809 A | 12/1997 | Hook | |
| 5,967,618 A * | 10/1999 | Wimmer | ............ A63C 17/223 301/5.308 |
| 6,439,671 B1 | 8/2002 | Lehnhardt | |
| 7,111,911 B2 | 9/2006 | Baumgartner | |
| 7,878,600 B2 * | 2/2011 | Krantz | ............ B60C 7/24 301/5.309 |
| 8,528,917 B2 | 9/2013 | Bartles | |
| 9,643,454 B2 | 5/2017 | Kumar | |
| 2007/0120416 A1 * | 5/2007 | Pusch | ............ B60B 33/0039 301/5.1 |
| 2008/0265660 A1 | 10/2008 | Hofmann | |
| 2011/0156471 A1 * | 6/2011 | Elovaris | ............ B60B 37/10 301/5.7 |
| 2015/0042147 A1 * | 2/2015 | Snoek | ............ B60B 3/02 301/5.304 |
| 2016/0214436 A1 * | 7/2016 | Purushothaman | ............ A63C 17/22 |
| 2021/0061008 A1 | 3/2021 | Messina et al. | |

FOREIGN PATENT DOCUMENTS

| | | | |
|---|---|---|---|
| DE | 20319099 | 6/2005 | |
| FR | 2661865 A1 * | 5/1990 | |
| FR | 2720689 | 12/1995 | |
| JP | H07236726 A | 9/1995 | |
| WO | WO-2006081594 A1 * | 8/2006 | ............ B66B 7/046 |

* cited by examiner

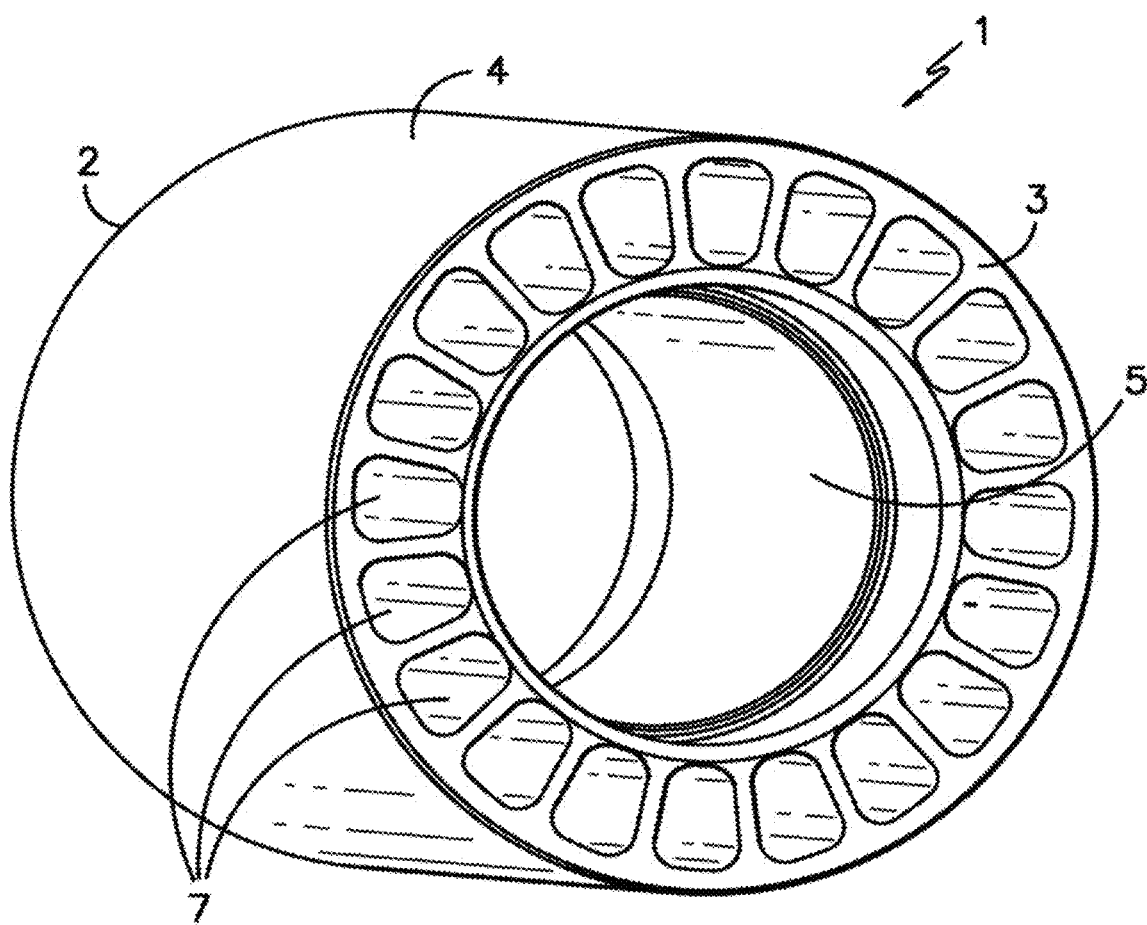
FIG. -1-

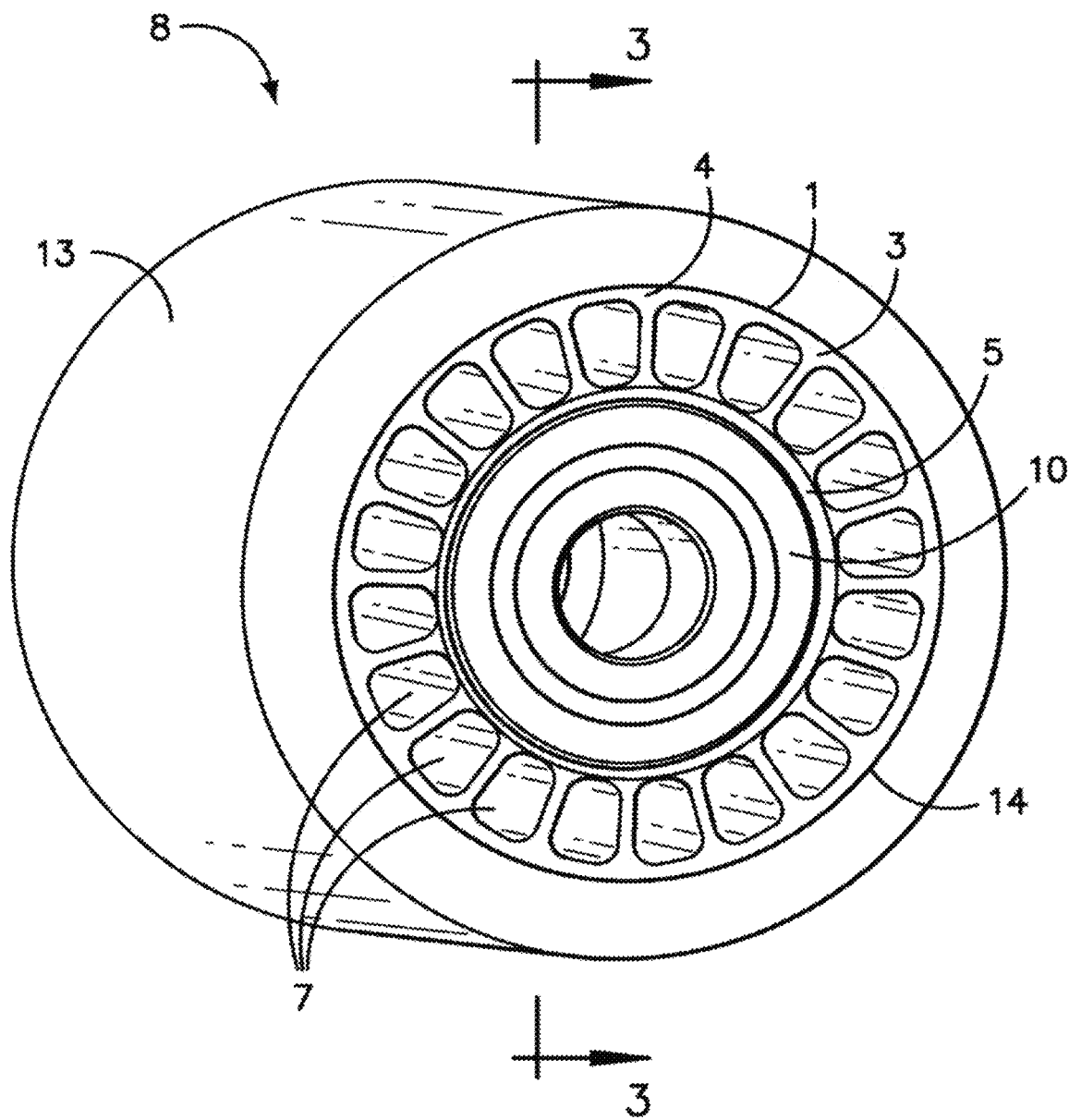
FIG. -2-

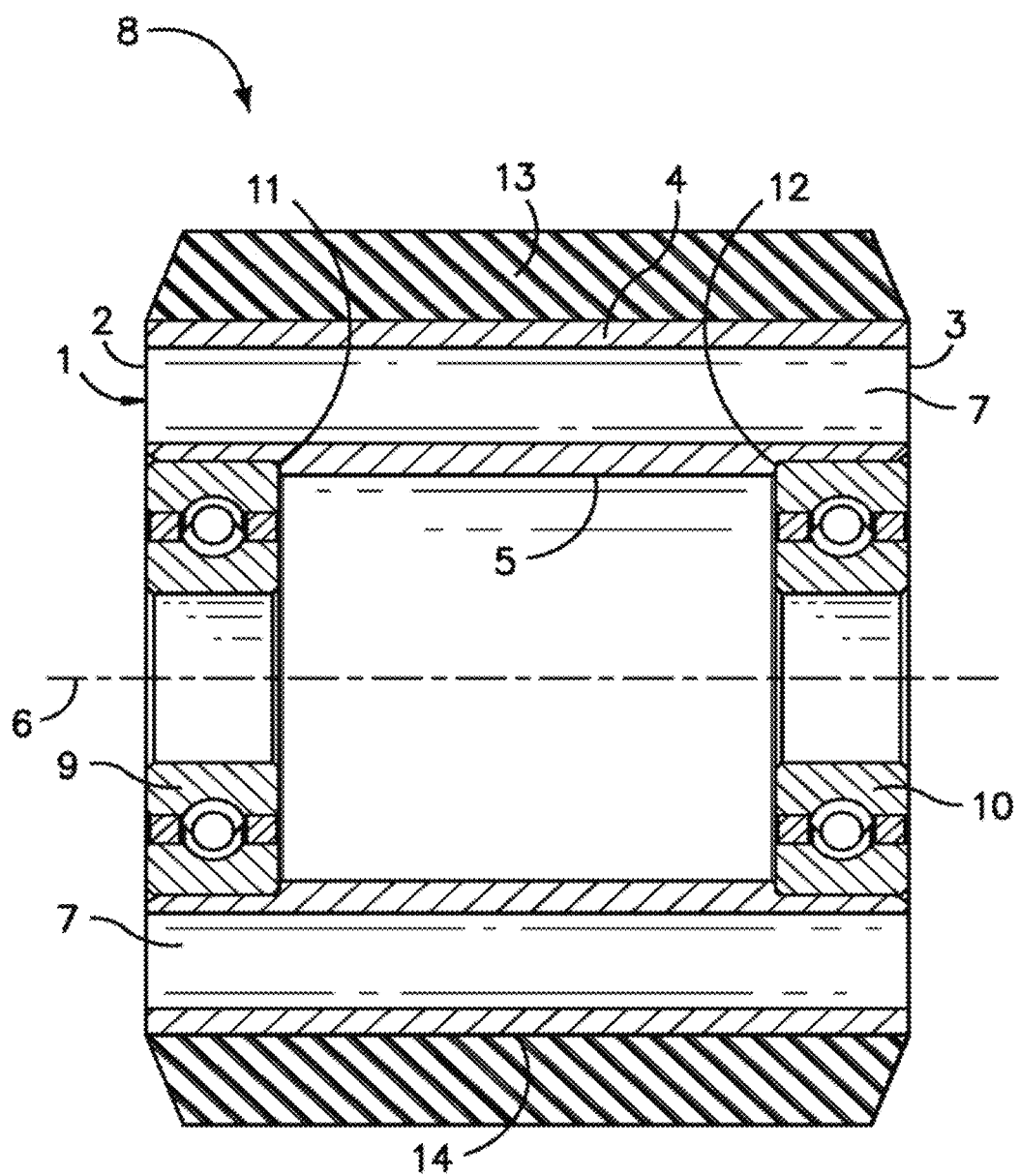
FIG. -3-

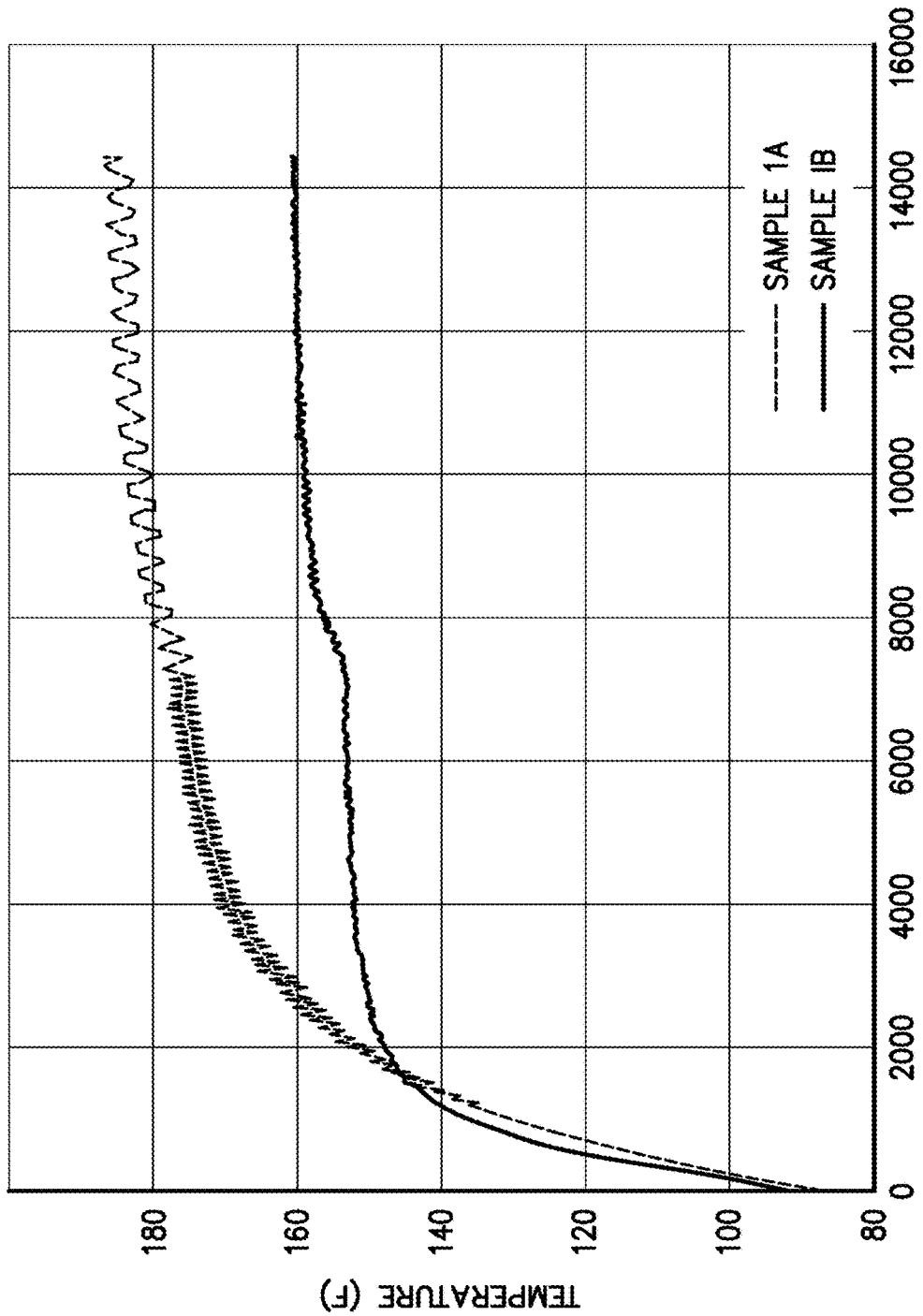
FIG. -4-

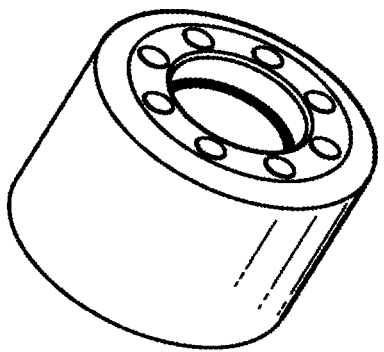
FIG. —5D—
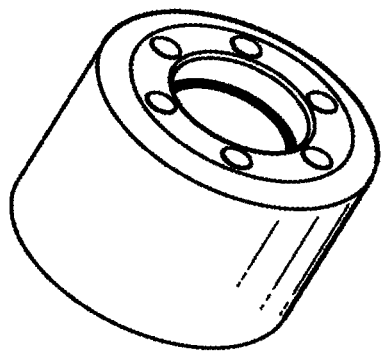
FIG. —5C—
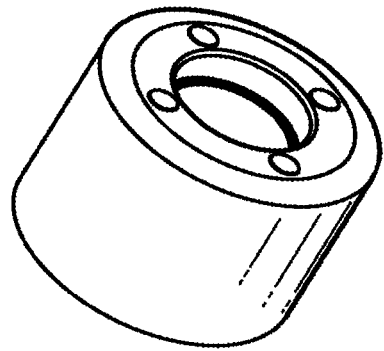
FIG. —5B—
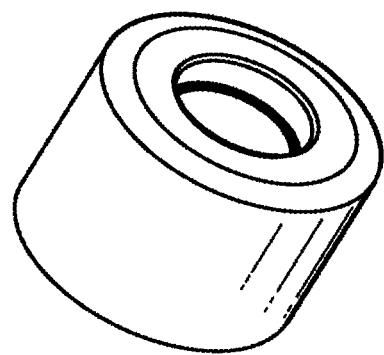
FIG. —5A—
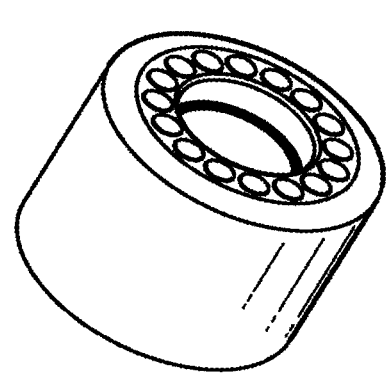
FIG. —5H—
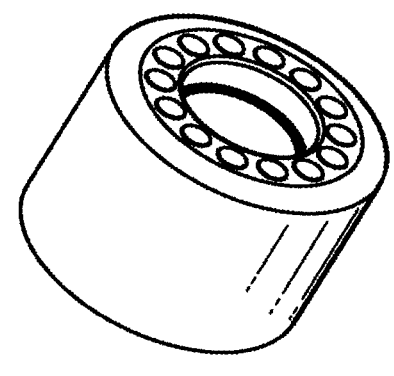
FIG. —5G—
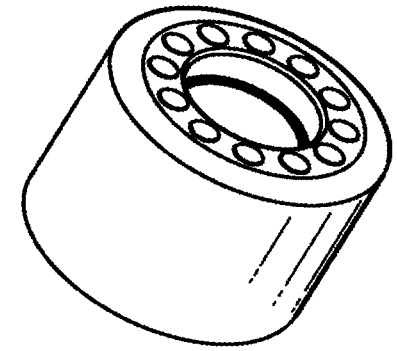
FIG. —5F—
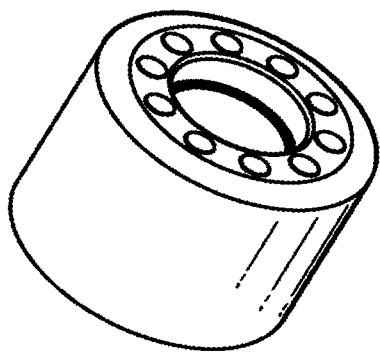
FIG. —5E—

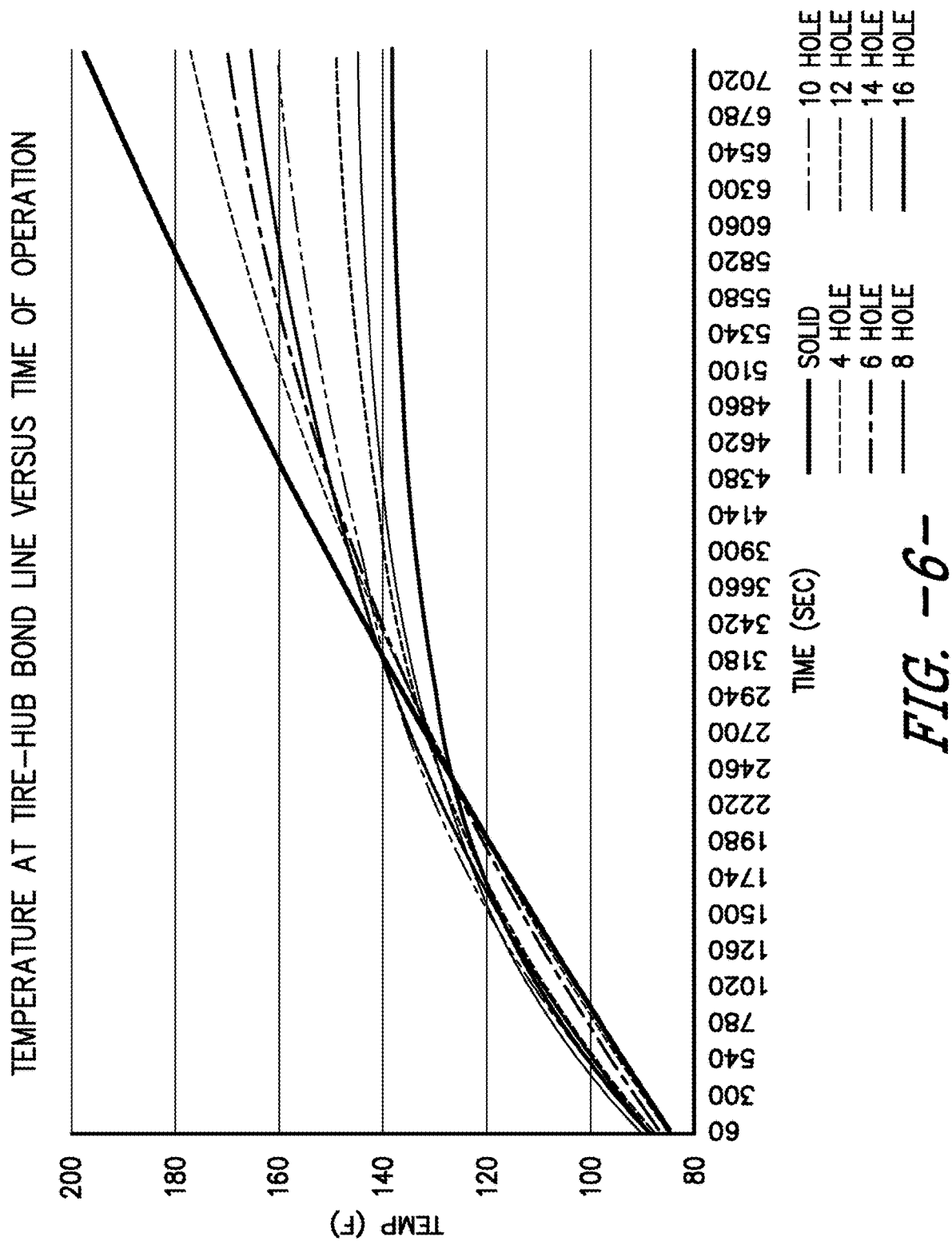
FIG. -6-

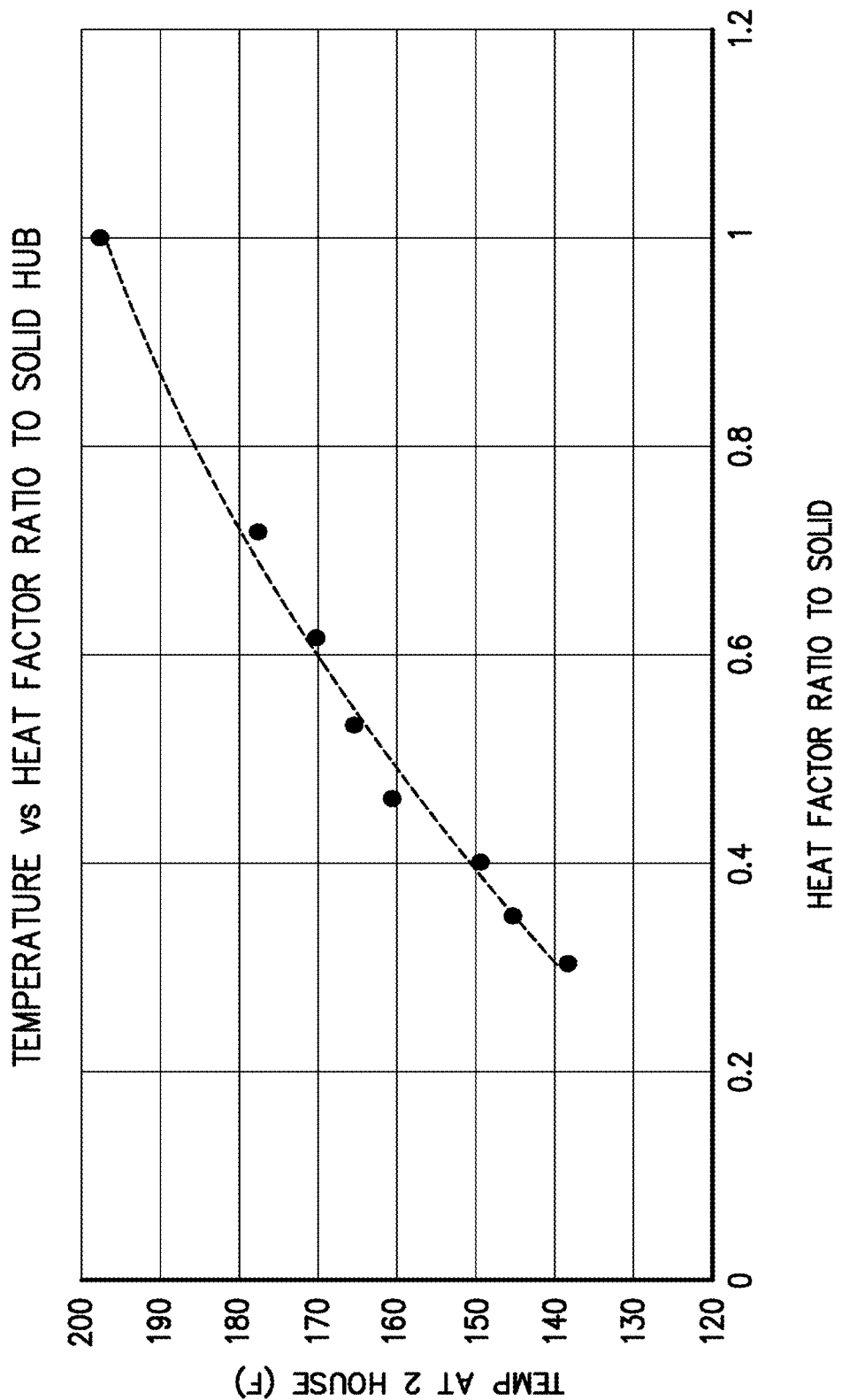
FIG. -7-

LOAD WHEEL WITH HEAT DISSIPATING HUB

This invention pertains generally to load wheel for a vehicle, in particular, for a material handling vehicle. The load wheel has a cylindrical hub with a plurality of axial passageways, a central core and an outer surface. A set of bearings is mounted in the central core of the hub, and a non-pneumatic tire is affixed to the outer surface of the hub.

BACKGROUND OF THE INVENTION

Load wheels may be used with vehicles designed for material handling, such as fork lifts, skid trucks and dollies. Typically, load wheels are comprised of a cylindrical, solid hub of metal, such as steel, with an axial aligned core for receiving a set of bearings. A non-pneumatic tire, such as a solid, polyurethane or rubber elastomer, is affixed to the outer surface of the hub.

Small diameter load wheels, for example 10" or less in diameter, experience high loads and rotational speeds relative to larger diameter, pneumatic tires. Industrial vehicles are needed that can perform at increasing levels of service duty, to keep pace with the changing nature of global trade, e-commerce, and the increasing use of automated/robotic operations. Large warehouse operations, for example, have long aisles that can be most efficiently serviced by material handling equipment that can both move quickly and carry heavy loads. These long runs, high speeds, and heavy loads put tremendous demands on the wheel assemblies of material handling equipment. Bearings and tires generate heat under load and this heat contributes to lower lifetimes and premature failures of tire, bearings and the bond between the tire and hub, any of which can cause equipment downtime and inefficiencies, when equipment cannot operate at the desired loads, speeds, and/or durations required. Additionally, special cause failures due to bearing heat generated when debris from warehouse operations and pallet packaging becomes entangled with the rotating wheel assembly causes a cascading failure mode in which the bearing and frictional heating from the debris cause early failures of the tire material or its adhesion to the wheel hub.

The most common failure modes of load wheels that cause downtime in the typical operations of material handling vehicles is bond failure between the tire and the outer surface of the hub and bearing failures. Normal potential failure modes for solid industrial tires include phenomena such as abrasive wear, chunking out, delamination from the rim hub, and thermal failure due to heat build-up from material hysteresis. However, smaller diameter wheels have the potential to be more susceptible to two particular, and sometimes related, failure modes for solid tires: bond failure and bearing failures. Unlike pneumatic tires which have a bead that is seated into the rim and held in place with tire pressure, solid tires in demanding dynamic load carrying applications are typically affixed to the hub by mechanical or chemical adhesive systems.

Mechanical lock strategies for fastening solid tires are well known and typically include ribs, tabs or through holes on the hub that the elastomer mechanically engages with, and is often used for thermoplastic elastomer tire materials. While mechanical lock strategies are commonly used for lighter duty applications of solid tires, such as inline skate wheels and light caster wheels, these mechanical lock structures on the hubs can create high pressure points and internal failure points for high duty situations.

For high duty (heavy load, high speed) applications of vulcanized and thermoset elastomer solid tires, a chemical bonding approach is commonly used. Chemical bonding creates a chemical link between the hub material and the elastomer, and typically gives higher performance than the mechanical lock approach. However, the adhesive chemistry is susceptible to weakening at high temperatures. During high duty cycle use, the heat being generated from the elastomer and/or the bearings weakens the bond strength of the adhesive. At the same time, the small radius of load wheels and smaller tires creates a greater point loading and pressure at the bond line between the elastomer and the hub. In essence, material on the forward side of the tire is forced into a rolling "bulge" as the vehicle moves. This action creates a high stress on the bond line due to the small diameter. Coupled with high temperatures, bond failure can be an issue with small solid tires in heavy duty applications.

Above a certain temperature, the adhesive strength of the bond will be lowered to a critical point and the chemical adhesive will fail, allowing the elastomer tire to become free from the hub and separate. This is the equivalent of a "flat tire" and causes down time and additional maintenance time and expenses as the tire must be replaced. For most high performance materials used in urethane elastomer tires, the bond failure or weakening due to temperature can be near or even below the critical temperature of failure of the elastomer. This means that there is the potential for the bonding adhesive to fail before the theoretical load carrying capacity of the tire elastomer is reached. The bond then becomes the limiting factor in the design and performance of the tire and wheel assembly. And, as the economy moves increasingly more towards online shopping, high efficiency 24-hour warehouses, and autonomous vehicles, even greater demand is placed on the tire to hub bond.

The bearings inside a wheel assembly are also subjected to heat, either by heat transfer from the elastomer through the hub material, or due to heat generated by the bearing itself through friction in use, both from the rolling elements contacting the bearing surfaces and the movement of the internal components through the oil or grease lubricant. The elevated temperatures cause premature wear and failure either as the lubricant loses viscosity or eventually leaks from the bearing or due to chemical/oxidative degradation of the lubricant. Either situation causes a further increase in heat, which is ultimately a source of heat contributing to the tire elastomer as described above. Keeping the bearings cooler will help prevent premature failure and from transferring excess heat to the chemical bond and the tire elastomer.

A special issue that commonly affects small wheels in material handling applications and warehouse operations is debris and trash becoming lodged or wrapped around the axle and/or bearing area, especially plastic wrap, shrink wrap, straps, and long fibers. Debris such as plastic wrap from palletized goods can be picked up during material handling equipment operations and become wrapped around the axles between the wheels and the vehicle frame, forks, or outrigger structure. The axle, passing through the center of the bearings, becomes tightly bound with the debris, which rubs against the axle, vehicle structure, and bearings. This causes intense frictional heating of the bearing area and disrupts airflow directly to the bearing. While this can be detrimental to ultimate bearing life, it is also very damaging to the elastomer tire and bond. The heat can be conducted through the hub, causing thermal and chemical degradation of the bond system used to adhere the elastomer to the hub as well as the elastomer itself. Insulating or isolating the bearing and elastomer heat sources from each other will improve the performance of the tire and wheel assembly.

Even if the tire elastomer remains bonded and the bearings remain unobstructed, the elevated temperatures commonly experienced during operation lead to measurable changes in the physical properties of many rubbers and polyurethane compounds. For example, the tear strength and abrasion resistance can be significantly decreased, causing premature wear of the tire or treat material.

In sum, keeping the chemical adhesive bond layer, the tire, and the bearings below their degradation temperatures during vehicle operation will prolong their useful life and increase the performance and efficiency of the material handling vehicles incorporating the load wheel assemblies.

The problem of heat generation in solid industrial tires is not new and, in fact, bearing manufacturers and elastomer producers have been trying to solve the known problems of heat generation from friction and dynamic hysteresis for many years. The market needs, however, due to changing economic dynamics, consumer spending habits, and globalization have outstripped the pace of the improvements. A different approach is needed and, therefore, the present invention provides a new hub design, which helps remove the excess heat from the load wheel assembly, isolate the heat generating components from each other, and effectively dissipate that heat harmlessly into the air. By transferring heat efficiently out of the bonded surface and the bearing surface of the hub and dissipating it effectively, one can simultaneously reduce heat experienced by the bond and the bearings, while isolating their generated heat from negatively impacting each other's behavior. This results in a higher performance wheel system.

Standard load wheel hubs for small diameter tires and load wheels are typically solid steel or cast iron. These are very robust from a material strength perspective and straightforward to manufacture as they have been used with virtually the same design for many decades. For relatively brief periods of operation, the high heat conductivity and mass of the solid hubs, is a benefit heat generated by the tires and bearings is rapidly absorbed by the hub. Nevertheless, during continuous operation for longer periods of time, solid hubs exacerbate the heat issues due to (i) the solid hub being a continuous 360°, thermally conductive, radial pathway between the bearings to the elastomer tire, and (ii) the low surface area to volume ratio of the solid hub, limits the dissipation of heat generated from the tire and bearings to the environment. Furthermore, the solid steel or cast iron hubs continues to heat the bearings and elastomer even after the vehicle stops, as the hub cools slowly due to its large mass and low surface area exposed to the atmosphere.

The continuous conductive pathway and the lack of efficient heat dissipation from the bearings and the elastomer causes heat to become trapped in the wheel assembly and can potentially cause a cascading chain reaction of thermal breakdown of the adhesive bond and bearing failure, as the tire and bearings generate heat, which in term lowers the performance of the components and causes further additional heat generation until a critical temperature is reached.

Heat energy can be transferred through conductive, convective and radiative pathways. For the wheel structures of importance in the present invention, the largest factors driving heat transfer within, and out of, the wheel structure is composed of two factors: conductive and convective heat transfer. In an effective hub design, the combined thermal transfer of heat energy out of the wheel must be greater than that of a traditional solid metal hub, typically steel or cast iron hub, by an amount that will lower the temperature experienced by the chemical adhesive bond. The best option is to have very good heat transfer away from the bond line, while thermally insulating the elastomer system from the bearing area. The design objectives are difficult to achieve using the standard solid hub design.

SUMMARY OF THE INVENTION

A load wheel is provided having a cylindrical hub, a tire bonded to the outer surface of the hub, and a set of bearings mounted in the central core of the hub.

The hub is substantially cylindrical in shape and is characterized by an axis extending between a first sidewall, which forms one base of the cylinder, and a second sidewall, which forms the opposite base of the cylinder. The hub has an outer surface, which corresponds to the curved walls of a cylinder. The hub has a central core defining an opening in the hub extending coaxially with the hub axis, from the first sidewall to the second sidewall. The central core receives a set of bearings, or optionally, two sets of bearings one set at either end of the core. It can be understood that the first and second sidewalls of the hub are annular in shape, extending radially from the central core to the outer surface of the hub.

A plurality of passageways are provided in the hub positioned between the outer surface of the hub and the inner surface of the hub, defined by the central core. The passageways extend from the first sidewall to the second sidewall, thereby creating conduits for air to flow through and cool the hub.

A solid, non-pneumatic tire is affixed to the outer surface of the hub. In one embodiment of the invention, the outer surface of the hub is free from projections designed to mechanically engage the tire, such as tabs with through holes and the like. Instead, the tire may be bonded to the outer surface of the hub with, for example, an adhesive, also referred to herein as being chemically bonded.

The central core of the hub is adapted to accept a set of bearings. In one embodiment of the invention, a set of bearings is inserted at each end of the central core, as is known in the art. The central core of the hub may be provided with a shoulder, that is, a relatively narrow section between the two ends of the central core, which maintains the position of a set of bearings near a sidewall of the hub. The bearings may be annular in shape, with a center opening for mounting the load wheel on the axle of a vehicle.

The hub may be characterized by a heat factor, which can be used to predict the temperature at the bond interface between the tire and the outer surface of the hub. The "heat factor" is equal to the (hub mass×hub specific heat)/surface area exposed. The exposed surface areas are the surfaces exposed to the air during operation, including the tire, the first and second sidewalls of the hub, the surface area of any passageways or features in the sidewalls, but do not include surfaces that would be occluded by bearings or axles such as the bearing bores or the space between bearing bores such as the walls of the central core. Of particular interest is that a low heat factor is a reliable indicator of the bond interface temperature at relatively long operating intervals, for example, after 60 minutes of operation, after 90 minutes of operation or even after 120 minutes of operation.

The heat factor obtained for a hub of the present invention may be compared to a theoretical hub of the same outer and inner diameter that does not contain passageways, referred to herein as a solid hub. Thus, the "heat factor ratio" is equal to:

$$\frac{\left[\frac{\text{Inventive Mass} \times \text{Specific Heat}}{\text{Surface Area}}\right]}{\left[\frac{\text{Mass Solid} \times \text{Specific Heat}}{\text{Surface Area}}\right]}$$

Hubs having a heat factor ratio of less than or equal to 0.7, or even less than or equal to 0.5, have been found to be advantageous in the present invention.

The hub may be constructed from a material having a thermal conductivity of 50 BTU/(hr-ft-° F.) or greater, or even 100 BTU/(hr-ft-° F.) or greater. The hub may be constructed of a material may having a density of 0.26 lbs/in$^3$ or less, or even 0.2 lbs/in$^3$ or less. By way of example, suitable material of construction include aluminum, aluminum alloys, magnesium and magnesium alloys. In one embodiment of the invention, the hub is extruded. Accordingly, metals that may be extruded are especially useful in the present invention. In another embodiment of the invention, the hubs may be die cast. Accordingly, metals that may be die cast are especially useful in the present invention.

The wheels may be relatively wide, as measured by the extent of the wheel in the axial direction. As the outer surface area of the hub increases, it has been found to be useful to increase the surface area of the internal passageways through the hub. Accordingly, a hub may be characterized by its outer surface area (the surface area of the hub bonded to the tire) and the combined internal area of the plurality of passageways extending through the hub, wherein the ratio of the internal area of the passageways to the area of the outer surface area of the hub is 1 or greater, or even 1.3 or greater.

A solid, non-pneumatic tire may be used in the present invention. For example, the tire may be a polyurethane elastomer, in particular, a thermosetting polyurethane or polyurethane/polyurea elastomer, such as a toluene diisocyanate (TDI) or methylenediphenyl diisocyanate (MDI), phenylenediamine (PPDI) or napthalenediisocyanate (ND) based polyurethane, constructed using prepolymers or polyol componenents comprising polyethers, polyesters, or polycarbonates. The prepolymer backbones may be comprised of backbones derived from polyethers such as polyethylene glycol, polypropylene glycol, or polytetramethylene ether glycol (PTMEG) as well as other ethers or combinations of various ethers. In another embodiment the prepolymer backbones may be comprised of polyester segments produced from dicarboxylic acids and a dial such as adipic acid and a glycol, or alternatively from monomers such as ε-Caprolactone to produce poly(caprolactone)-based diols for the urethane prepolymer component construction. By example these various urethane systems are sold commercially under the trade names Adiprene, Vibrathane, and Duracast from Lanxess Corp., or Elastocast from BASF Corp., or Imuthane from COIM Group, or Desmodur, Baytec, and Vulkolan from Covestro Corp., Erapol from Era Polymers, or Suprasec from Huntsman Corp. These systems may be cured or chain-extended with aromatic amine curatives such as 4,4'-Methylenebis(2-chloroaniline), 4,4'-diaminodiphenylmethane (MDA), complexes of MDA with salts, methylene bis(2,6-diethyl-3-chloroaniline) (MCDEA), or liquid amine curatives such as 3,5-diethytoluene-2,4-diamine and 3,5-diethytoluene-2,6-diamine (DETDA), dimethylthiotoluenediamine (DMTDA), or methylene bis (ortho-ethylaniline) (MBOEA). Alternatively in certain embodiments of the invention the polyurethane tire elastomers may be cured or chain-extended with diols such as 1,4-butanediol, 1,3-propanediol, 2-methyl-1,3-propanediol, 1,6-hexanediol, hydroxyethyl ether of resorcinol, or hydroquinone-bis(2-hydroxyethyl)ether (HQEE). These thermoset urethane elastomer systems may be molded as pre-mixed single component systems (also known as 1k systems), or mixed on demand two-part systems, so called-prepolymer and chain-extender/curative systems or 2k systems, or 3-component systems such as "quasi"-MDI systems. Additives such as dyes, colorants, pigments, and stabilizers may be added to the urethane elastomer resin mixture during molding in certain embodiments of the invention as is well known in the art to produce various differentiated elastomer products. The tire is bonded to the outer surface of the hub with a suitable, chemical adhesive, such as those available from Lord Corporation such as the Chemlok family of adhesives, or CONAP adhesives available from Elantas, or Cilbond adhesives available from H.B. Fuller Company, among many others, as is known in the art.

BRIEF DESCRIPTION OF THE DRAWINGS

FIG. 1 is side perspective view of the hub of the present invention.

FIG. 2 is a side perspective view of the load wheel assembly.

FIG. 3 is a side sectional view of the load wheel of FIG. 2.

FIG. 4 is a graph of the temperature of the load wheel versus time of operation for a solid hub (comparative) and a hub of the present invention.

FIG. 5A is a perspective view of a prior art load wheel, with no passageways through the hub.

FIG. 5B is a perspective view of a load wheel of the present invention having four passageways through the hub.

FIG. 5C is a perspective view of a load wheel of the present invention having six passageways through the hub.

FIG. 5D is a perspective view of a load wheel of the present invention having eight passageways through the hub.

FIG. 5E is a perspective view of a load wheel of the present invention having ten passageways through the hub.

FIG. 5F is a perspective view of a load wheel of the present invention having twelve passageways through the hub.

FIG. 5G is a perspective view of a load wheel of the present invention having fourteen passageways through the hub.

FIG. 5H is a perspective view of a load wheel of the present invention having sixteen passageways through the hub.

FIG. 6 is a graph of the temperature of the load wheel calculated at the bond line between the tire and outer surface of the hub versus time of operation.

FIG. 7 is a graph of the operating temperature of the load wheel versus the Heat Factor Ratio of the wheel. The vertical "Y" axis shows the temperature after 2 hours (7,200 seconds) of operation.

DETAILED DESCRIPTION OF THE INVENTION

Without intending to limit the scope of the invention, the preferred embodiments and features are hereinafter set forth. All of United States patents and published patent applications cited in the specification are incorporated herein by reference. The term "polymer" or "polymeric" as used in the present application denotes a material having a weight average molecular weight ($M_w$) of at least 5,000. The term "copolymer" refers to a polymer derived from more than one species of monomer, and is intended to include, for example, terpolymers and quaterpolymers. Unless otherwise indicated, conditions are 25° C., 1 atmosphere of pressure, and 50% relative humidity. Unless otherwise indicated, average values are weight averages.

Referring to FIG. 1-3, cylindrical hub 1 has a first sidewall 2 and a second sidewall 3, opposite the first sidewall. Hub 1 has an outer surface 4 and an inner surface 5 defining a central core within hub 1, which extends coaxially with axis 6. A plurality of passageways 7 extend axially between outer surface 4 and inner surface 5 of hub 1. Passageways 7 are open at either end, that is, at both sidewall 2 and sidewall 3. Together, the cumulative areas within each of passageways 7, as well as the area of sidewalls 2 and 3 (less openings for passageways 7) constitute the surface area of hub 1 exposed to the ambient air, during operation of the load wheel.

Referring to FIGS. 2-3, load wheel 8 is made up of hub 1, bearings 9 and 10, which may be pressed into the central core of hub 1, defined by inner surface 5. Shoulders 11 and 12 are formed by recesses within the central core, and bearings 9 and 10, respectively, butt against the shoulders within inner surface 5 of hub 1. Tire 13 is bonded to outer surface 4 of hub 1 at interface 14 with a suitable adhesive, such as the Chemlok family of adhesives, or CONAP adhesives available from Elantas, or Cilbond adhesives available from H.B. Fuller Company. Tire 13 may be a thermosetting elastomer, such as a polyurethane elastomer, as is conventionally used in load wheels.

Example 1

Sample 1A (Comparative). A prior art, standard 5" diameter by 3.875" wide polyurethane load wheel was produced using a conventional cast iron hub. The hub was machined from a grey iron casting using a CNC lathe. The hub was then prepped for adhesive using typical degreasing and blasting procedures to remove contaminants and apply a surface profile to improve elastomer adhesion. The hubs were then sprayed with adhesive and dried. After drying, the hubs were then pre-heated in an oven to activate the adhesive and placed into steel molds before being poured with a 2-part hot cast, MOCA-cured, TDI ether polyurethane that results in a 96 shore A hardness tire compound. After demolding, the parts were post-cured at temperature for 24 hrs.

Sample 1B (Present Invention). A high-performance 5" diameter by 3.875" wide polyurethane load wheel was produced from extruded aluminum. An aluminum extrusion was designed with a web structure as shown and cut to width. The hub of the load wheel approximated the design shown in FIGS. 1-3. The bearing bores were then machined into the hub using a CNC lathe. The high performance hubs were then prepared and manufactured into load wheels following the same procedure as the comparative standard load wheels described in Sample 1A.

Testing: Sample 1A and Sample 1B were both pressed with identical sets of 6305-2RS bearings and loaded onto a custom designed dynamometer test machine with a 36" rotating drum. The samples were placed into a pivoting fixture to allow even load distribution between the test samples as the samples are compressed against the drum to simulate loading and speeds that the tire and wheels would experience in field usage. Computer controlled hydraulics and drive motors were programmed to apply the following loading and speed program to the test wheels shown in Table 1, below.

TABLE 1

Example 1, Load Program for Dynamometer Testing of Sample 1A and Sample 1B Load Wheels

| Total Load Applied | Load Per Test Wheel | Speed | Duration |
|---|---|---|---|
| 5000 lbs | 2500 lbs | 3 mph | 2 hrs |
| 5400 lbs | 2700 lbs | 3 mph | 2 hrs |

During testing, thermal imaging of the side-by-side test samples was recorded using a FUR A325sc camera. Temperature versus time recordings were captured on the exterior surfaces of the bearings and polyurethane tire sidewalls from Sample 1A (Comparative) and Sample 1B (Present Invention). The results are presented graphically in FIG. 4.

The side-by-side testing of Sample 1A, the standard offer load wheel currently used in the material handling industry, and Sample 1B, the inventive high performance load wheel, shows that the two wheels perform differently under the same operating conditions. Initially during start-up and low operating times, the high performance wheel Sample 1B increases in temperature more rapidly than the standard wheel Sample 1A. Surprisingly, Sample 1A quickly becomes higher temperature than Sample 1B as steady-state operation is achieved. At the higher loading state, Sample 1A continues to run hotter than Sample 1B. Sample 1B's low mass, high surface area, and good thermal conductivity allow heat to be quickly transferred from the bearings and the tire to the hub, where it can effectively dissipate to the environment. Sample 1A's relatively large mass, low surface area, and lower thermal conductivity traps heat inside of the bearings and the elastomer and causes them to operate at a higher temperature.

Example 2

Several different hubs were modeled using CAD software and thermal simulation software was used to analyze the effects of hub mass, specific heat, surface area, work or power applied to the hub, and different convective coefficients. The hubs were modeled with an elastomer tire to match industry standard 5" diameter wheels with a width of 3.875" and an elastomer cross-section of approximately 0.5", such as described in Example 1, herein. The tire and wheel assemblies that were modeled are shown in Table 2, below, and in FIG. 5. Samples 2A-2H are shown in FIGS. 5A-5H, respectively.

TABLE 2

Example 2 - tire and wheel assemblies 2A through 2H

| Sample Hub | Mass | Material | Specific Heat (BTW/lb-° F.) | Hub Diameter (in) | Hub Width (in) | Exposed Hub Area (in²) | Tire Bond Area (in²) |
|---|---|---|---|---|---|---|---|
| 2A | 3.153 | Aluminum | 0.215 | 4 | 3.875 | 16.483 | 48.694 |
| 2B | 2.856 | Aluminum | 0.215 | 4 | 3.875 | 39.2602 | 48.694 |
| 2C | 2.707 | Aluminum | 0.215 | 4 | 3.875 | 50.648 | 48.694 |
| 2D | 2.559 | Aluminum | 0.215 | 4 | 3.875 | 62.036 | 48.694 |
| 2E | 2.411 | Aluminum | 0.215 | 4 | 3.875 | 73.425 | 48.694 |

TABLE 2-continued

Example 2 - tire and wheel assemblies 2A through 2H

| Sample Hub | Mass | Material | Specific Heat (BTW/lb-° F.) | Hub Diameter (in) | Hub Width (in) | Exposed Hub Area (in²) | Tire Bond Area (in²) |
|---|---|---|---|---|---|---|---|
| 2F | 2.262 | Aluminum | 0.215 | 4 | 3.875 | 84.8132 | 48.694 |
| 2G | 2.114 | Aluminum | 0.215 | 4 | 3.875 | 96.201 | 48.694 |
| 2H | 1.965 | Aluminum | 0.215 | 4 | 3.875 | 107.589 | 48.694 |

The elastomer tire was modeled such that power could be applied in the thermal simulation from a center cross-section within the tire mass in order to simulate the internal heat build-up due to hysteresis during cyclic loading from tire operation. The cross section within the tire to which was applied power is approximately 3.0" by 0.13", centered within the tire elastomer in a ring shape.

Samples 2A through 2H were then modeled using Solid-Works Simulation Professional using the thermal simulation tool. A power of 20 watts was applied to the central section of the tire elastomer as described. A convection of 10 Watts/m² was applied to the exposed surfaces which include the tire tread surface and sidewalls and the exposed hub sidewalls. The bearing bores and internal surfaces between the bores were excluded from convection since these spaces would be occupied or concealed from air flow when fitted with bearings and a shaft during operation. The initial temperatures of the materials were set to 72° F. and the ambient air temperature was also set to 72° F. The simulation was run for 7200 seconds, recording data points every 60 seconds for a total of 120 data points. The temperature readings were probed from the simulation at the interface between the tire elastomer and the metal hub, which is the location of the thermally sensitive and application critical adhesion area between the tire and the hub.

The temperature of the load wheel at the bond line between the tire and outer surface of the hub over time of operation, for each of the sample load wheels 2A-2H is shown in FIG. 6.

The simulation results show that, initially, the heavier mass and lower surface area hubs produce a lower temperature experience by the bond between the tire and the hub. Surprisingly, however, at longer times which are more representative of continuous operation, the higher mass and lower surface area hubs operate at higher temperatures. The rate of initial temperature increase is related to the power (load and speed of the tire operation), the hub mass, and its specific heat based on its material of construction. The operating temperature, however, is related to its ability to remove excess thermal energy from the system and dissipate it to the environment. Because convective loss depends, in part, on the temperature differential between the object and the ambient air, a relationship between the hubs mass, specific heat, and exposed surface area can be used to define the desired performance range of a high performance hub. The "Heat Factor" is defined herein as the hubs mass multiplied by its specific heat, divided by the total exposed surface area of the tire and wheel system, exclusive of bearing bores and internal surfaces:

Heat Factor=(hub mass×hub specific heat)/surface area exposed

For a given tire elastomer and hub material, a desired Heat Factor Ratio can be found between a high performance design and a standard solid design by taking the ratio of the Heat Factors of a given tire and wheel design versus a design using solid hub wheel of the same material. A design with a solid hub such as an industry standard load wheel would have a Heat Factor Ratio of 1 by definition. In order to operate in a region that provides high performance and extend the life of the bearings, a ratio less than 1 is desired and lower is better. Table 3, below contains the Heat Factor and the Heat Factor Ratio calculated for load wheel assemblies 2A-2H.

TABLE 3

| Sample Hub | Mass | Material | Specific Heat (BTW/lb-° F.) | Total Wheel Surface Area (in²) | Heat Factor | Heat Factor Ratio |
|---|---|---|---|---|---|---|
| 2A | 3.153 | Aluminum | 0.215 | 86.443 | 0.007842 | 1 |
| 2B | 2.856 | Aluminum | 0.215 | 109.2202 | 0.005622 | 0.716904 |
| 2C | 2.707 | Aluminum | 0.215 | 120.608 | 0.004826 | 0.615344 |
| 2D | 2.559 | Aluminum | 0.215 | 131.996 | 0.004168 | 0.531515 |
| 2E | 2.411 | Aluminum | 0.215 | 143.385 | 0.003615 | 0.460998 |
| 2F | 2.262 | Aluminum | 0.215 | 154.7732 | 0.003142 | 0.400685 |
| 2G | 2.114 | Aluminum | 0.215 | 166.161 | 0.002735 | 0.348804 |
| 2H | 1.965 | Aluminum | 0.215 | 177.549 | 0.003927 | 0.303424 |

Based on the simulation data, the temperature after 2 hours of operation can be plotted as a function of the Heat Factor Ratio, and is shown in FIG. 7.

Example 3

To illustrate the effectiveness of the Heat Factor Ratio in determining a high performance hub design, simulations were run in the same manner as Example 2, but switching the hub designs out to a low Heat Factor Ratio design in 3 different materials. The hub has a diameter of 4" and a width of 3.875. Bearing bores are designed for 6305 sized bearings (62 mm OD). The hub design is illustrated FIGS. 1-3.

Samples 3A, 3B, and 3B were modeled in CAD and put through the same simulation parameters used in Example 2. The hub materials were aluminum for 3A, mild steel for 3B, and copper for 3C. Their properties were calculated as shown in Table 4, below.

TABLE 4

| Sample | Material | Mass (lbs) | Exposed Hub Surface Area (in²) | Total Wheel Surface Area (in²) | Bonded Surface Area (in²) | Specific Heat (BTU/lb-° F.) | Heat Factor | Heat Factor Ratio To Solid | Temp at 7200 sec |
|---|---|---|---|---|---|---|---|---|---|
| 3A | Aluminum | 1.555 | 132.342 | 202.302 | 48.694 | 0.215 | 0.001653 | 0.210735 | 127.74 |
| 3B | Mild Steel | 4.493 | 132.342 | 202.302 | 48.694 | 0.122 | 0.00271 | 0.345512 | 129.23 |
| 3C | Copper | 5.127 | 132.342 | 202.302 | 48.694 | 0.0923 | 0.002339 | 0.298286 | 128.27 |

As shown in Table 4, the Heat Factor Ratio of samples 3A-3C predicts the lower operating temperatures of the bond surface, even though the hubs have identical design dimensions and differ only in material of construction.

Example 4

The most common failures for small diameter tires are often bond failures, due to thermal degradation of the bond between the tire and the hub. This is caused by bearing heat generation and dynamic heating from elastomer hysteresis under cycling loading during high duty cycle operation. To test the ultimate performance of the high performance load wheel design, a test to failure was performed. 5" OD by 3.875" width load wheels with either an industry standard solid cast iron hub or a high performance, low Heat Factor Ratio hub of extruded aluminum (both as produced in example 1) were individually tested on a dynamometer using the following test conditions outlined in Tables 5 and 6, below.

TABLE 5

| Initial Loading (lbs) | Load Increase Amount (lbs) | Load Time Intervals (hrs) | Test Speed (3 mph) |
| --- | --- | --- | --- |
| 2500 | 200 | 2 | 3 |

TABLE 6

| Sample | Description | Heat Factor Ratio |
| --- | --- | --- |
| 4A | Solid Cast Iron Hub | 1 |
| 4B | Aluminum Extruded Hub | 0.211 |

The samples, 4A (standard wheel, comparative) and 4B (inventive), were each loaded onto the test dynamometer for their respective runs after being fitted with identical 6305-2RS bearings. The wheels were tested at 2500 lbs. loading at 3 mph, with the loading increased every two hours by 200 lbs. The test was run until failure. Temperature was recorded using an infrared temperature probe positioned to record temperatures at the external bond/hub interface line where the tire sidewall meets the hub. After the test the wheels were examined to determine the type of failure (bond, material, bearing, etc.).

TABLE 7

| 4A Running Time (hrs) | Load (lbs) | External Temp. °F. |
| --- | --- | --- |
| 2 | 2500 | 134 |
| 2 | 2700 | 140 |
| 2 | 2900 | 145 |
| 2 | 3100 | 149 |
| 2 | 3300 | 154 |
| 2 | 3500 | 159 |
| 2 | 3700 | 164 |
| 2 | 3900 | 173 |
| 0.8 | 4100 | 198 |

TABLE 8

| 4B Running Time (hrs) | Load (lbs) | External Temp. °F. |
| --- | --- | --- |
| 2 | 2500 | 131 |
| 2 | 2700 | 136 |
| 2 | 2900 | 141 |
| 2 | 3100 | 147 |
| 2 | 3300 | 151 |
| 2 | 3500 | 155 |
| 2 | 3700 | 161 |
| 2 | 3900 | 166 |
| 2 | 4100 | 172 |
| 2 | 4300 | 182 |
| 2 | 4500 | 190 |
| 2 | 4700 | 198 |
| 2 | 4900 | 203 |
| 2 | 5100 | 205 |
| 0.5 | 5300 | 206 |

The failure of 4A was categorized as "bond failure", which is when the tire material remains essentially intact but separates from the hub during operation. Although the failure load for this size standard wheel is excellent for industry standards, bond failure is considered an "early" failure in that the elastomer material still had remaining dynamic load carrying capacity at failure and could not be tested until material degradation.

The failure mode of sample 4B was found to be "material failure", which is defined as material degradation with the adhesive bond layer still intact between the hub and the tire elastomer. This is observed in this case as a "bubble" where material degraded and became molten, forming a bulge in the tire that tripped the failure switch of the test. This is considered a full life test in that the material was run until its load carrying capacity is reached. While well above design limits for field use and no material failure would be expected in the field, the high performance hub design allowed the bond and the material to function together to achieve significantly higher performance than the standard wheel in 4A. This could allow industrial equipment to operate at higher loads and/or speeds while maintaining adequate safety factors for the tire and wheel performance. The load wheels of the present invention may be provided for use in the following applications.

Material handling vehicles including fork trucks, pallet trucks, reach trucks, order picker trucks, and automated material handling equipment (automated or autonomous guided vehicles or AGV's) used in warehousing, food distribution, food processing, e-commerce, and industrial facilities. The load wheels of the present invention are particularly useful for electric fork trucks and pallet trucks including class I electric motor rider trucks, class II electric motor narrow aisle trucks, and class III electric motor hand or hand/rider trucks. The load wheels of the present invention for these applications generally range in diameter from about 2" to about 10" and generally have widths from about 1.5" to 8".

The load wheels of the present invention may also be useful in floor/pavement maintenance applications such as floor cleaning equipment and industrial sweepers, scrubbers, burnishers, polishers, etc. as drive and idler wheels. These units may be walk behind or especially ride-on units which carry heavier loads at higher speeds to cover large facilities such as factories, warehouses, parking garages, campuses, etc. The load wheels of the present invention for these applications generally range in diameter from about 3" to about 12" and generally have widths from about 1.5" to 10".

The load wheels of the present invention may also be useful for load wheels used in high speed dynamic applications such as amusement rides including roller coasters, monorails, trams, cable cars, etc. due to the very high speeds, intense dynamic loadings, and repetitive motions required, which would benefit from the higher performance of these inventive load wheels. The load wheels of the present invention for these applications generally range in diameter from about 1" to about 12" and generally have widths from about 1.5" to 6".

The inventive load wheels may also be useful in autonomous vehicle or robotic vehicles (AGV's) as the lower temperatures and higher performance afforded by the inventive wheels will reduce failures and maintenance issues that could cause machine operation interruption in the absence of a human operator and could enable the vehicles to operate at higher speeds and loads than otherwise would be safe as compared to operations with human operators/passengers. The load wheels of the present invention for these applications generally range in diameter from about 3" to about 12" and generally have widths from about 1.5" to 10".

The inventive wheels may also be useful in heavy duty continuously loaded operations requiring roller type wheel motion within such equipment as conveyors and trommels, as the rollers to support the loads and drive the belts or support and/or drive the trommel drums and components. These applications require extended continuous use and heavy loads in harsh environments and higher performance load wheels which run cooler will provide improved performance of the equipment and efficiency of the operations as compared to standard wheels. The load wheels of the present invention for these applications generally range in diameter from about 2" to about 18" and generally have widths from about 2" to 48".

There are, of course, many alternative embodiments and modifications, which are intended to be included in the following claims.

What we claim is:

1. A load wheel for a material handling vehicle, comprising:
   (a) a cylindrical hub having an axis, a first sidewall, a second sidewall, an outer surface, an inner surface, a central core defining an opening within the hub extending coaxially with the hub axis from the first sidewall to the second sidewall, and a plurality of passageways open at either end for exposure to the environment positioned between the outer surface and the inner surface and extending in an axial direction between the first sidewall and the second sidewall, and wherein the hub has a heat factor ratio of 0.7 or less, wherein the cylindrical hub has a diameter from about 3 inches to 12 inches and a width from 1.5 inches to 10 inches, wherein the hub is constructed of a material selected from the group consisting of aluminum, aluminum alloys, magnesium and magnesium alloys;
   (b) a solid, non-pneumatic tire bonded to the outer surface of the hub, wherein the outer surface of the cylindrical hub is free from projections designed to mechanically engage the tire; and
   (c) a set of bearings press fit into bearing bores in the inner surface of the hub, wherein the bearings comprise a center opening for receiving an axle of a vehicle.

2. The load wheel of claim 1, wherein the hub has a heat factor ratio of 0.5 or less.

3. The load wheel of claim 1, wherein the hub is constructed from a material having a thermal conductivity of 50 BTU/(hr-ft-° F.) or greater.

4. The load wheel of claim 1, wherein the hub is constructed from a material having a density of O.26 lbs/in$^3$ or less.

5. The load wheel of claim 1, wherein the hub is characterized by an exposed surface area comprising the area of the first and second sidewalls and the internal area of the plurality of passageways, and the ratio of the exposed surface area to the area of the outer surface of the hub that is bonded to the tire is 1 or greater.

6. The load wheel of claim 1, wherein the tire is bonded to the outer surface of the hub with a chemical adhesive.

7. The load wheel of claim 1, wherein the tire is a polyurethane elastomer.

8. The load wheel of claim 7, wherein the polyurethane elastomer is a thermosetting material.

9. The load wheel of claim 8, wherein the polyurethane elastomer is selected from the group consisting of toluene diisocyanate, methylenediphenyl diisocyanate, naphthalene diisocyanate, and phenylene diisocyanate based polyurethanes.

10. The load wheel of claim 1, wherein the hub is manufactured by extrusion.

11. The load wheel of claim 10, wherein the hub is constructed of a material selected from the group consisting of aluminum and aluminum alloys.

12. A material handling vehicle comprising a load wheel for a material handling vehicle according to claim 1.

13. The load wheel of claim 1, wherein the bearings abut shoulders formed in the inner surface, wherein the shoulders maintain the position of the outer face of the bearings near the sidewall of the hub.

* * * * *